Patented Nov. 18, 1952

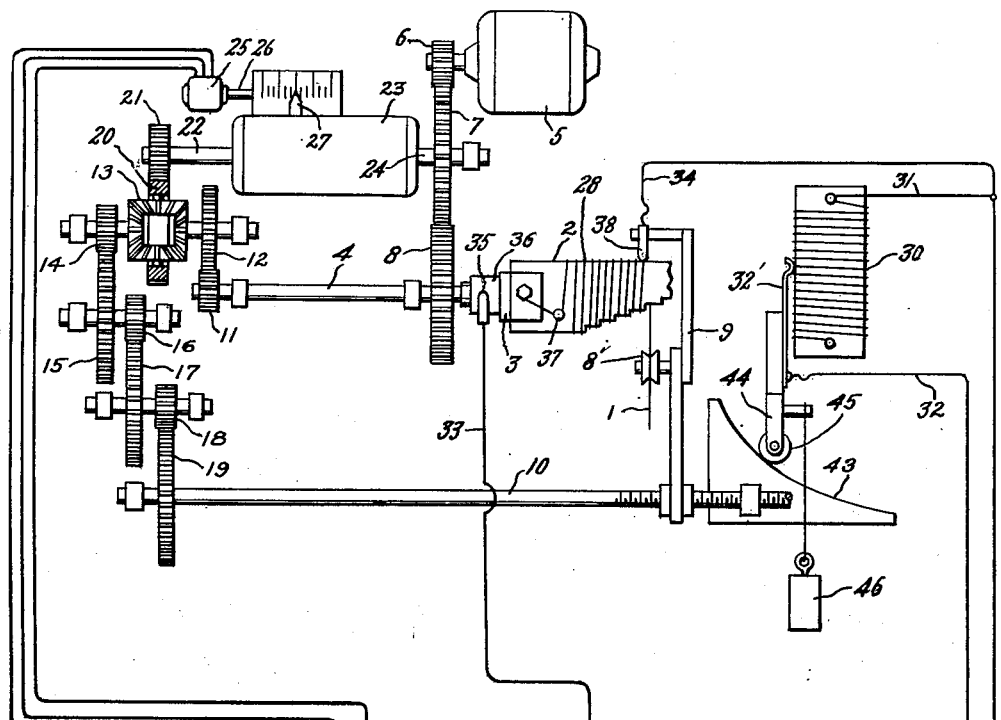
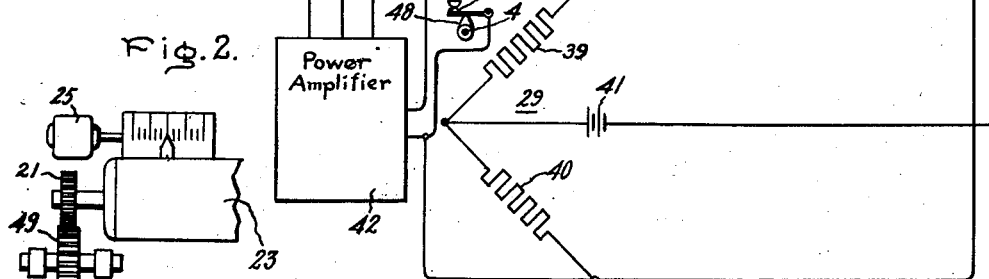
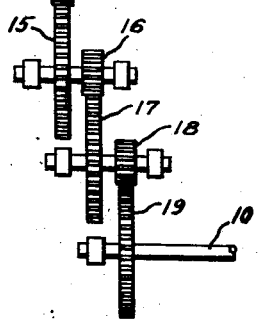
Inventors:
Benjamin B. Scott,
George F. Greene,
Frank E. Valentine,
by
Their Attorney.

2,618,440

UNITED STATES PATENT OFFICE 2,618,440

WINDING MACHINE

Benjamin B. Scott, George F. Greene, and Frank E. Valentine, Schenectady, N. Y., assignors to General Electric Company, a corporation of New York Application August 3, 1949, Serial No. 108,342

5 Claims. (Cl. 242—9)

This invention relates to winding machines, more particularly to machines for winding precision variable resistance units and has for its object simple, reliable and accurate means for changing the winding rate during the winding operation thereby to change the spacing of the turns to give the desired resistance characteristics.

More specifically, this invention relates to apparatus for winding resistance wire into precision variable resistance units having either linear or non-linear resistance characteristics such that the variation in resistance of the unit as an electric contact is moved over bared edge portions of the resistance turns is in accordance with a desired mathematical function of the contact movement, such as described and claimed in a copending application of John R. Moore, Serial No. 664,471, filed April 24, 1946 for Variable Resistor Winding Machine, which application is assigned to the same asignee as this application.

In the winding of such resistances, the total resistance wire that has been wound is compared continuously with a desired resistance up to that point and any deviation from a predetermined ratio, such as 1:1, between the wound resistance and the corresponding portion of a master resistance is corrected by immediate positional adjustment of the turn being wound. In the machine of the aforesaid Moore application a fixed gear driving ratio is provided between the winding spindle stock and the lead screw which traverses the carriage feeding the wire to the card or support on which the wire is being wound. In this gearing is a differential which is operated by a suitable servomotor to adjust the position of the turn being wound in accordance with any deviation of the wound resistance from the desired value.

Further objects of this invention are the provision of means for maintaining automatic synchronization and an exact preset speed ratio between the winding spindle and the carriage traverse lead screw regardless of the speed of the spindle, with exact synchronous acceleration and deceleration of the spindle and lead screw, and an infinitely variable adjustment in the driving ratio between the spindle and the lead screw.

In one form of the invention, a differential is included in this gearing, which differential is continuously operated through a variable-speed gearing from the winding machine driving motor thereby to vary the driving ratio of the gearing. In another form of the invention, a variable-speed gearing is introduced in the driving connection between the headstock and the lead screw for the winding head. In each case the variable speed gearing is adjusted by means of a servomotor controlled in response to deviations in the resistance of the wound portion of the resistance.

For a more complete understanding of our invention, reference should be had to the accompanying drawing, Fig. 1 of which is a diagrammatic view showing a winding machine embodying this invention, while Fig. 2 is a fragmentary view showing a modified form.

Referring to the drawing, the resistance wire 1 is supplied under suitable tension from a reel (not shown) to a support 2 made of electrically insulating material, this support being shown as a strip or card having a straight edge, which is the brushing or contact edge, and a plurality of steps on its other edge to assist in providing desired resistance variations. The card is secured to a headstock 3 mounted on a shaft or spindle 4 which is driven by an electric motor 5 through gears 6, 7 and 8 for rotation of the card 2 in a clockwise direction, as viewed from the left hand.

For the purpose of guiding the wire to its desired turn spaced position on the card, the wire passes over a guide pulley 8' mounted on a carriage or winding head 9, which is traversed in a direction parallel with the shaft 4 by means of a lead screw 10.

In accordance with one form of this invention, a differential gear 13 is interposed in the gearing connecting lead screw 10 with the headstock shaft 4, this gearing comprising the gears 11 to 19, inclusive. For the purpose of varying the driving ratio of this gearing, the ring gear 20 of the planetary gearing is connected to a gear 21 on a shaft 22 of an infinitely or steplessly variable speed gearing 23, the input shaft 24 of which is connected to the gear 7. Adjustment of the gear ratio of the gear 23 is preferably made by means of an electric servomotor 25 connected to turn the speed changing shaft 26 of the gear. However, it may be adjusted by turning the shaft 26 manually, if desired, the adjusted position being indicated by pointer 27 co-operating with a suitable scale. The adjustability obviously need not exceed limits determined by the desired minimum and maximum lead screw speeds.

The driving ratio of the gears 11 to 19, inclusive, is such that when the differential ring gear 20 is stationary, this driving ratio is either too high or too low as compared with the driving ratio required to give the desired speed relation between the lead screw 10 and the headstock shaft 4. Consequently, to obtain this desired speed relation, the ring gear 20 is continuously rotated at a speed determined by the adjustment of the variable gear 23. For example, if the speed ratio with the gear 20 stationary is too high so that the lead screw 10 is driven at a speed lower than required, the ring gear is constantly driven in a counter-clockwise direction, as viewed from the left hand so as thereby to reduce the speed ratio of the gearing and raise the speed of the lead screw 10 to the desired value.

The servomotor 25 is preferably a low inertia, split phase gear type motor having two field windings for forward and reverse rotation respectively. It is energized, when the resistance of the wound portion 28 of the resistance unit varies a predetermined amount from the desired value up to that point, under the control of a Wheatstone bridge 29 which compares the amount of the resistance 28 with the correct value of a master resistance 30 at that point as included between the terminal connection 31 and a connection 32 leading to a brush 32' bearing on the master resistance. By means of the conductors 31 and 32, the master resistance is connected in one arm of the bridge 29, while the wound resistance 28 is connected in a corresponding arm of the bridge by means of the conductors 33 and 34. The conductor 33 leads to a brush 35 bearing on a slip ring 36 which is connected electrically to the end terminal 37 of the resistance, while the conductor 34 leads to a suitable wire electric contact device 38 (shown diagrammatically) making contact with the wire as it is being wound on the card. Suitable adjustable fixed resistances 39 and 40 are included in the other two arms of the bridge, the bridge being energized by a suitable source of direct current, such as a battery 41.

The voltage unbalance of the bridge 29 is supplied to a suitable power amplifier and phase discriminator 42, such as disclosed in the aforesaid Moore application, which selectively energizes the servomotor 25 for forward or reverse rotation in dependence on the polarity of the bridge unbalance voltage.

The contact 32' is moved over the master resistance 30, which is a precision wound linear resistance, by means of a cam 43 having a shape such as to give the desired resistance variation. As shown, the contact 32' is mounted on a slider 44 having a roller 45 on one end held against the cam 43 by means of a weight 46 connected to the slider. The cam is driven in a predetermined relation with the winding head 9 by means of the lead screw 10.

In the operation of the machine any deviation from a predetermined relation, such as 1:1, between the wound resistance 28 and the included master resistance produces a bridge unbalance voltage, the polarity of which depends upon the direction of the deviation, i. e., whether the resistance 28 is too small or too large. If the resistance 28 is too great, for example, the turn spacing must be increased and the servomotor 25 is energized in a direction to decrease the driving ratio between the shaft 4 and the lead screw 10 and thereby increase the speed of the lead screw.

It will be understood that several turns ordinarily are required to be wound on the card at the adjusted winding speed before the bridge is again balanced, the bridge balance being effected by the adjusted rate of movement of the contact 32' over the resistance 30. It is contemplated, therefore, that to prevent over-shooting of the servomotor 25 the operation of the motor is preferably limited to a short interval during the winding of each turn. This limitation may be effected by means of a normally open switch 47 connected across the terminals of the bridge 29. The switch is operated by a cam 48 connected to the shaft 4 to its closed position and maintained closed over the desired portion of each revolution in which the bridge is most stable. The speed of rotation of the servomotor 25 while the switch 47 is closed is determined by the value of the bridge unbalance voltage. A system including a switch such as the switch 47 operated by a cam such as the cam 48 forms a portion of the subject matter which is disclosed and claimed in patent application, Ser. No. 664,471 filed April 24, 1946, by John R. Moore for a "Variable Resistor Winding Machine" and assigned to the assignee of the present invention.

In the modified form of the invention shown in Fig. 2, the differential 13 of Fig. 1 is eliminated and also the gear 12, the gear 21 meshing directly with a gear 49 which, in turn, meshes with the gear 15. In other words, in this modification the variable speed gear 23 is connected directly in the driving connection between the shaft 4 and the lead screw 10.

It will be observed that, since the servomotor adjustment of the infinitely variable ratio gear 23 is a permanent one, rather than an instaneous one for adjusting a particular turn, the spindle 4 and the lead screw 10 are accelerated and decelerated in the preset speed ratio relation synchronously during the starting and stopping of the winding operation. This is an important feature of this invention because it maintains the desired spacing between the turns that are wound during acceleration and deceleration. In the winding of precision resistances the winding machine is often stopped several times during the winding of a single resistance, as for the connection of taps or provision for their connection.

While we have shown a particular embodiment of our invention, it will be understood, of course, that we do not wish to be limited thereto since many modifications may be made and we therefore contemplate by the appended claims to cover any such modifications as fall within the true spirit and scope of our invention.

What we claim as new and desire to secure by Letters Patent of the United States is:

1. A resistance winding machine comprising driving means for turning a support, means for feeding a wire to the support, a lead screw for moving said feeding means, and a gear driving connection between said lead screw and said driving means including a variable speed ratio gearing adjustably settable for stepless variation of said speed ratio for moving said feeding means at a speed settable between predetermined limits to feed the wire to said support in a predetermined spaced turn relation, said variable speed ratio gearing being constructed to maintain said predetermined speed relation between said support and said lead screw for synchronous acceleration and deceleration of said support and wire feeding means during the starting and stopping of the winding operation.

2. A resistance winding machine comprising driving means for turning a support, means for feeding a wire to the support, a lead screw for moving said feeding means, a driving connection between said lead screw and said driving means for moving said feeding means at a predetermined adjustably settable speed to feed the wire to the support in a predetermined spaced turn relation, said driving connection including a differential gear having a ring gear rotatable to vary the ratio of said driving connection, a variable speed ratio gearing connected to drive said ring gear, a driving connection between said variable-speed gearing and said driving means, and means for adjusting the setting of said variable speed gear to vary the ratio of said driving connection and thereby vary the spacing of the wire turns wound on the support.

3. A resistance winding machine comprising driving means for turning a support, means for feeding a wire to the support, a lead screw for moving said feeding means, a gear driving connection between said lead screw and said driving means including a variable speed ratio gearing adjustably settable for stepless variation of said speed ratio for moving said feeding means at a speed settable between predetermined limits to feed the wire to the support in a predetermined spaced turn relation, a servomotor connected to adjust the setting of said variable speed gear to vary its ratio, means for comparing the resistance of the wire wound on the support with the desired resistance up to that point, and means responsive to the difference between said resistances for controlling said servomotor so as to vary the setting of said variable speed gear and thereby vary the spacing of the wire wound on the support.

4. A resistance winding machine comprising driving means for turning a support, means for feeding a wire to the support, a lead screw for moving said feeding means, a gear driving connection between said lead screw and said driving means including a variable-speed ratio gearing adjustably settable for stepless variation of said speed ratio between predetermined limits, a servomotor connected to adjust the setting of said variable speed gear, means for comparing the resistance of the wire wound on the support with the desired resistance up to that point, and means responsive to the difference between said resistances for controlling said motor so as to vary the setting of said variable speed gear and thereby vary the spacing of the wire wound on said support.

5. A resistance winding machine comprising driving means for turning a support, means for feeding a wire to the support, a lead screw for moving said feeding means, a gear driving connection between said lead screw and said driving means including a differential gear having a ring gear rotatable to vary the ratio of said gear driving connection, a variable speed ratio gearing connected to drive said ring gear, a driving connection between said variable-speed gearing and said driving means, a servomotor connected to adjust said variable speed gear to vary its ratio, means for comparing the resistance of the wire wound on the support with the desired resistance up to that point, and means responsive to the difference between said resistances for controlling said servomotor so as to vary the ratio of said gear driving connection and thereby vary the spacing of the wire wound on said support.

BENJAMIN B. SCOTT.
GEORGE F. GREENE.
FRANK E. VALENTINE.

REFERENCES CITED

The following references are of record in the file of this patent:

UNITED STATES PATENTS

| Number | Name | Date |
|---|---|---|
| 1,627,188 | Lightfoot | May 3, 1927 |
| 1,627,213 | Stone | May 3, 1927 |
| 2,500,605 | De Lange et al. | Mar. 14, 1950 |